May 28, 1935.    J. B. BRENNAN    2,002,626
HEAT CIRCULATOR FOR MOTOR VEHICLES
Filed Jan. 2, 1932
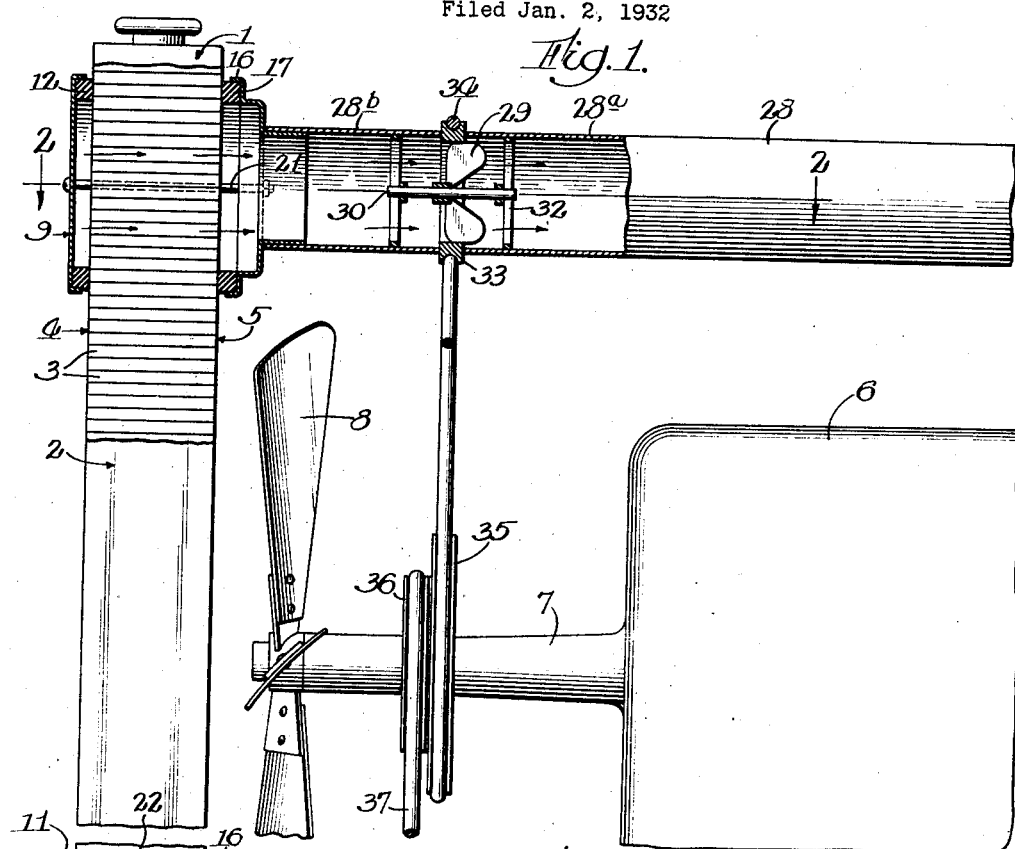
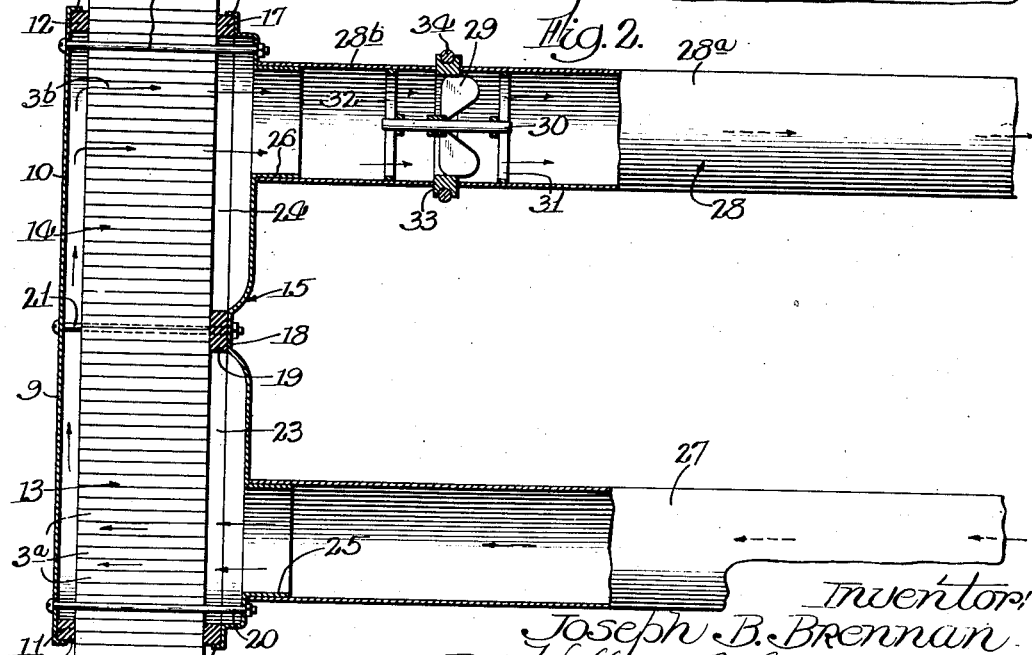
Inventor:
Joseph B. Brennan
By: Wallace R. Lane
Atty.

Patented May 28, 1935

2,002,626

UNITED STATES PATENT OFFICE 2,002,626

HEAT CIRCULATOR FOR MOTOR VEHICLES

Joseph B. Brennan, Fort Wayne, Ind., assignor to The Magnavox Company, Chicago, Ill., a corporation of Arizona Application January 2, 1932, Serial No. 584,506

5 Claims. (Cl. 257—125)

The present invention relates to heat circulation in a motor vehicle, and more particularly to the supplying of the heat to the compartment for the occupants and to the obtaining of the heat from the radiator of the vehicle.

Among the objects of the invention, is to conduct the air from the compartment to and through a portion or part of the radiator whereby the air absorbs heat from that part of the radiator, and to further conduct this air again to and through another portion or part of the radiator for further absorption of heat from this part of the radiator, and thence conducting the air so heated back to the compartment.

The invention also comprehends novel means for effecting the objects mentioned above, such as ducts or conduits communicating with the occupant compartment of the vehicle and with portions of the radiator, together with means for effecting a passage between said portions of said radiator, whereby the air may pass through a duct and a radiator portion in one direction, and thence through said passage to and through another radiator portion and another duct in another direction.

In another scope, the invention comprehends the provision of a novel means comprising a circuitous passage or duct which communicates with the compartment of the vehicle, and which includes as part of the circuit different parts or portions of the radiator where the circulating air absorbs heat.

Another object of the invention is to provide a novel method of conducting or circulating heated air to and from the vehicle compartment and reversely through different portions of the radiator.

A further object of the invention is to provide a novel attachment, in a heating device of this kind, comprising chamber members engaging opposite sides of a portion of the radiator, with a member divided into chambers having inlet and outlet means, or means for communicating with ducts communicating with the vehicle compartment while another of said members preferably spans, on the opposite side thereof, the radiator portions covered by the divided or partitioned chamber member, whereby air may pass from a divided chamber to and through a radiator portion, thence to and through the spanning member, thence to and through another radiator portion in reverse direction, and thence to and through another divided chamber. This effects a multi-pass of the air through the radiator or radiator core whereby the air absorbs a greater amount of heat than would be possible in the case of the air passing but once through a radiator core.

Other objects, advantages, capabilities, process steps, and features are comprehended by the invention as will later appear, and as are inherently possessed thereby.

Referring to the drawing:

Fig. 1 is a fragmentary view in elevation and with parts shown in section, of an illustrative embodiment of the invention, and Fig. 2 is a similar view in plan.

Referring more in detail to the drawing, the embodiment selected to illustrate the invention, is shown associated with a motor vehicle having a radiator 1, the core 2 of which may be of the honey-comb or like type, and preferably having a multiplicity of air passages 3 extending from the front 4 to the rear 5 thereof. The vehicle may have an internal combustion motor 6 carrying a fan bracket 7 for rotatably carrying a fan 8. The latter operates to draw air through the air passages 3 in the usual way.

The heating means or device of this invention, comprises an attachment connected to a portion of the radiator core, and preferably at the upper part thereof where the water in the core is at the highest temperature. At the front of the core 2 and at the upper part of the radiator, is located a chambered or pan shaped member 9 having a wall 10 and a perimetral flange 11. This flange engages a perimetral gasket 12 which may be made of any suitable material, such as composition, rubber, leather, wood, cork, fibre, or the like, and which is sufficiently yieldable as not to injure the face 4 of the core 2. The member 9 and the gasket 12 thus spans across the front of core portions 13 and 14, and encloses a shallow space or chamber extending across the front of said core portions 13 and 14.

At the rear of the core portions 13 and 14 and opposite the member 9, is located another chambered or pan shaped member 15 having a perimetral flange 16 engaging a perimetral gasket 17 of similar material to the gasket 12, this gasket engaging the rear face 5 of the radiator core. Intermediate the length of the member 15 is a depressed portion 18 between which and the face 5 of the core is located a partition 19 of the same material as the gaskets 12 and 17, and engaging in a line or strip against the face 5 between the core portions 13 and 14, as clearly shown in Figure 2 of the drawing.

For the purpose of holding the members 9 and 15 in engagement with the core portions 13 and 14, these members are provided with suitable apertures through which pass securing bolts 20, 21 and 22, these bolts passing through suitable air passages 3 as clearly shown in Fig. 2 of the drawing.

By reason of the partition 19, the member 15 is divided into chambers 23 and 24 respectively located opposite the core portions 13 and 14. These chambers are provided with inlet and outlet sleeves 25 and 26 to which are respectively connected air ducts or conduits 27 and 28 leading to and communicating with the occupant compartment of the vehicle.

For the purpose of inducing the movement or flow of air through these ducts and compartment as also the core portions 13 and 14, a blower is provided in one of the ducts such as in duct 28. The blower shown comprises a set of blades 29 secured to a shaft 30 rotatably supported in spiders 31 and 32 secured in the duct 28. The duct 28 comprises sections or segments 28$^a$ and 28$^b$ with the ends of the segments separated to provide a space in which may rotate an annular pulley 33 fixed or secured to the periphery or ends of the blades 29. This pulley may run closely with the ends of the duct segments so that there is practically no loss of air from the duct. The pulley 33 is grooved to receive a driving belt 34 operated from a pulley 35 secured to the fan pulley 36 connected to the fan 8. The fan pulley is driven by a fan belt 37 leading to and operated by a suitable operative part of the motor 6.

In operation the fan causes a flow of heated air through the duct 28 in the direction indicated by the arrows and into the compartment of the vehicle. At the same time the air in the compartment is drawn into the duct 27 and caused to flow therethrough into the chamber 23. The air then passes forwardly through the air passages 3$^a$ in the core portion 13 and into the chamber or passage of the member 9. The air then passes from in front of the core portion 13 to the front of the core portion 14 and then passes rearwardly through the air passages 3$^b$ of the core portion 14 and into the chamber 24. From this chamber 24 the air then passes into the duct segment 28$^b$ and through the blower 29 and thence through the duct segment 28$^a$.

From the above, it will become apparent that the air is circulated and re-circulated in a circuitous path which includes the compartment of the vehicle and the radiator core portions 13 and 14 and the chamber of the member 9. As the air passes through the core portion 13 a certain amount of heat is absorbed by the air and as the air then passes back through the core portion 14 further heat is absorbed by the air such that the air contains a larger amount of heat than if the air were to pass but once through a core or were to proceed from the outside through the core portion in a single pass directly to the compartment. By circulating and re-circulating the air in this manner whereby the air passes several times through the radiator core, a more efficient heating of the vehicle compartment is effected and maintained.

While I have herein disclosed and in the drawing shown an illustrative embodiment of my invention and a method of practicing the invention, it is to be understood that the invention is not limited thereto but comprehends other constructions, arrangements of parts, details, features, and process steps without departing from the spirit thereof.

Having thus disclosed the invention, I claim:

1. A heated air circulating means for a motor vehicle having a radiator, a fan, and a compartment for occupants, comprising a circuitous duct communicating with said compartment and including as part thereof portions of said radiator for heating the air passing through said duct and said radiator portions, a blower contained in said duct and forming a part thereof, and means for driving said blower from the fan.

2. In a heating device for a motor vehicle having an occupant compartment and a radiator, air ducts between said compartment and radiator, a fan, a pulley to operate said fan, a blower in one of said ducts and forming a part thereof, and means for operating said blower by said pulley for causing air to circulate in said device.

3. A heating device for heating the occupant compartment of a motor vehicle having a radiator, comprising ducts communicating with said compartment and with portions of said radiator, a passage communicating with said portions of the radiator whereby air may pass from a duct through one of said radiator portions to said passage and from said passage through another of said radiator portions to another of said ducts, a fan, a pulley to operate said fan, and a blower in one of said ducts and forming a part thereof and operated by said fan operating pulley for causing movement and circulation of said air.

4. In a heating device adapted to heat the occupant compartment of a motor vehicle provided with a radiator, comprising air ducts connecting said radiator and compartment, one of said ducts being built in sections, a pulley joining said sections, a fan within said sectional duct and driven by said pulley, means in said sections to support said fan and pulley, and means for driving said pulley from an operative part of the motor of said vehicle.

5. In a heating device for a motor vehicle having a passenger compartment and a radiator, a fan, ducts connecting said compartment and radiator, one of said ducts being built in sections, a blower between said sections and forming substantially an uninterrupted portion of said duct, means in said sections to support said blower, and a pulley to operate both said fan and said blower.

JOSEPH B. BRENNAN.